Dec. 4, 1956  C. H. JONES, JR  2,772,586
INDEXING MECHANISM
Filed March 24, 1954  2 Sheets-Sheet 1
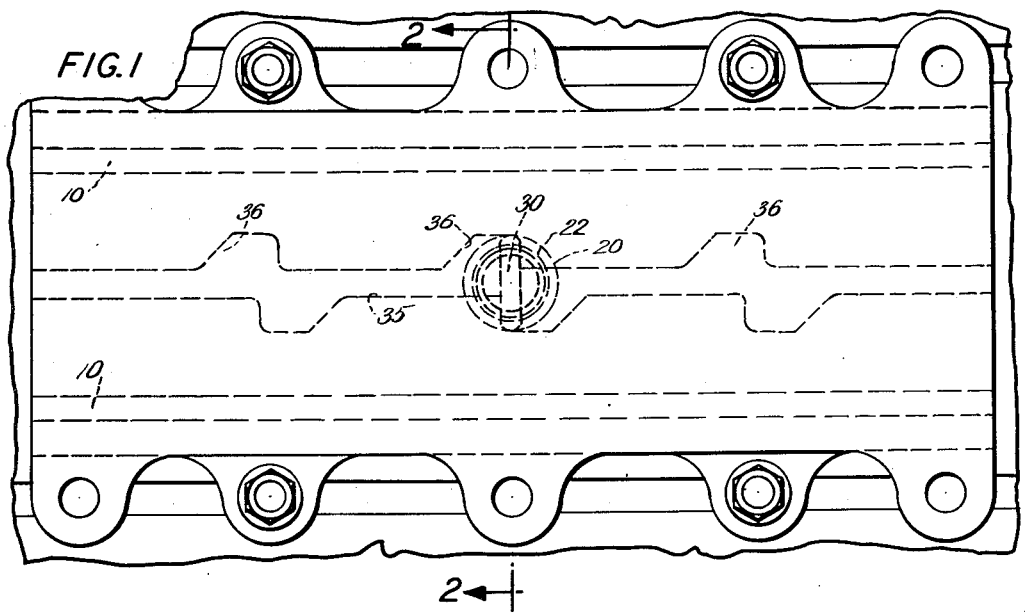
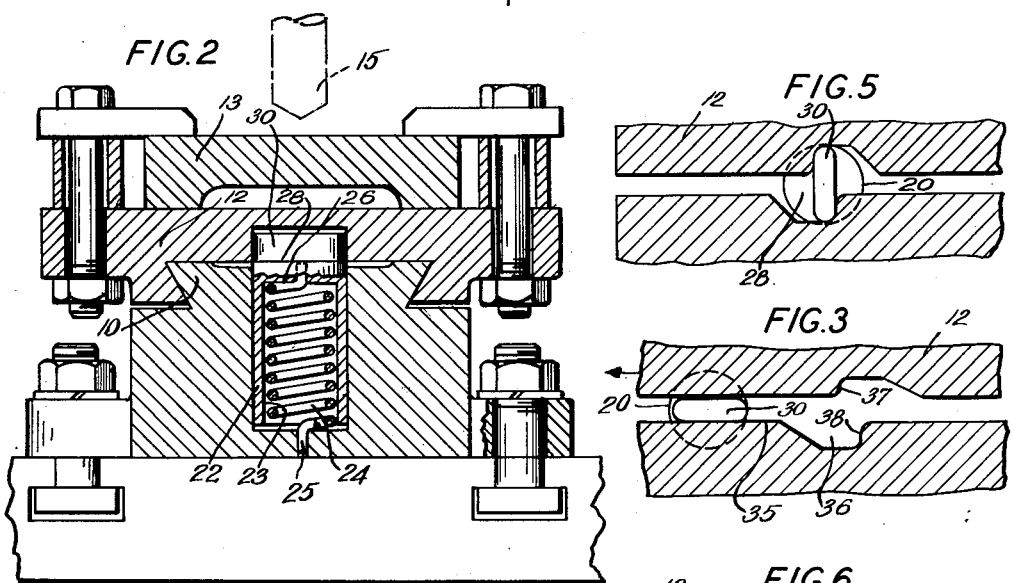
INVENTOR
CHARLES H. JONES JR
BY Dike, Thompson & Sanborn
ATT'YS.

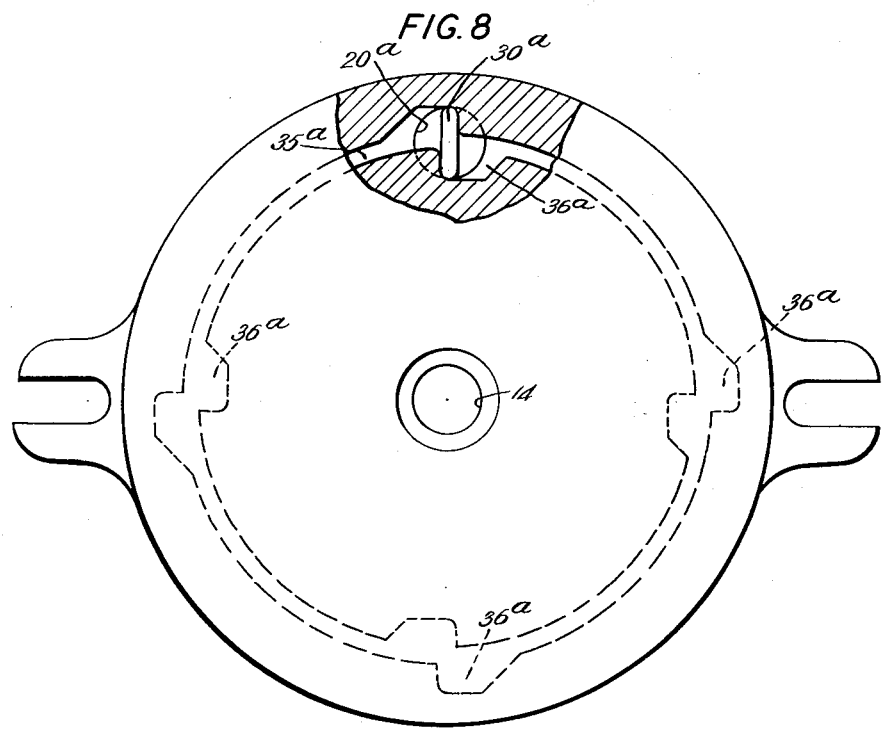
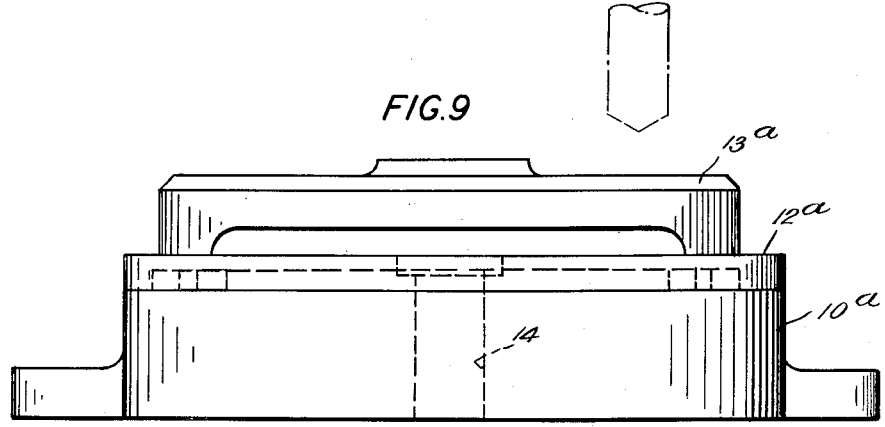

2,772,586
Patented Dec. 4, 1956

United States Patent Office

---

2,772,586

INDEXING MECHANISM

Charles H. Jones, Jr., Lunenburg, Mass., assignor to Gould Engineering and Sales Co., Inc., Leominster, Mass., a corporation of Massachusetts Application March 24, 1954, Serial No. 418,398

6 Claims. (Cl. 77—64)

This invention relates to an indexing mechanism for precisely positioning and locking in one or more predetermined locations, two relatively movable mechanical elements.

There are many machine design requirements for temporarily precisely locating one movable part relative to another at one or more predetermined points. For instance, in drilling holes at precise locations in a workpiece, the work may be relatively moved with respect to the drill so that the various drill hole locations are successively brought into operating position. In production work, it is necessary that the work be quickly movable from one position to another and yet be precisely indexed at each successive operating position by mechanical means which are not dependent upon the judgement of the operator.

In such a drilling operation the work may be mounted upon a work carrier, such as one or more slides or a turn table device which serve to carry it from one position to another, and some means employed to stop the carrier at predetermined position. In previous indexing mechanisms of this general type the indexing or positioning mechanism is usually a positively locked device, such as a pin or other means which falls or is inserted into a recess whereby the work carrier is indexed and locked at the predetermined position. Then, in order to move the work to the next position, it is necessary to withdraw the pin or otherwise to unlock the device which involves additional time and labor. Also, continuous use of such devices causes wear and play in the parts and consequent inaccuracy of the indexed position of the work.

My invention provides means to bring a moving part automatically to a precisely located predetermined stop under requirements of this general nature, and then to allow the moving part to move on automatically under an increase or excess of force applied to the moving part and without the necessity of an unlocking operation.

Furthermore, my indexing device is not subject to inaccuracies due to wear because it is so constructed that wear of the parts is equalized in such a manner that the predetermined indexed position is precisely maintained. The device comprises but a few simple component parts and is consequently economical to manufacture and to maintain.

My invention is adaptable to many uses, for instance, in the grinding wheel truing device described in my copending application, Serial No. 423,984, filed April 19, 1954, and in indexing the work and other elements in many types of machine tools, such as milling machines, cutters, drills, lathes, saws, boring machines and others. It is described in this application for use in indexing work to various successive operative positions in a drill.

In the drawings, Fig. 1 shows a top plan view of mechanism for supporting and indexing work from one position to another in a straight line, but with the work removed for clarity.

Fig. 2 shows a cross section along the line 2—2 of Fig. 1, also including the work mounted on the device.

Fig. 3 is a plan view of part of the mechanism being moved toward an indexed position.

Fig. 4 is a view similar to Fig. 3 with the mechanism entering the indexed position.

Fig. 5 is a view similar to Fig. 3 showing the mechanism locked in the indexed position.

Fig. 6 is a view similar to Fig. 3 showing the mechanism leaving the indexed position.

Fig. 7 is a view similar to Fig. 3 showing the mechanism moving on after it has left the indexed position.

Fig. 8 shows a plan view of a modified form of the invention for supporting and rotatably moving work to a succession of indexed positions with respect to a drill.

Fig. 9 is a side view of Fig. 8.

In the drawings, dovetailed slideway 10 supports a cooperatively dovetailed slide 12 on top of which is clamped a workpiece 13 which is to be moved to position a succession of precisely predetermined drill hole locations under a drill 15, which will drill a succession of holes in the work at these locations while the work is locked in each said position. A cylindrical hole 20 in the top of the ways 10 under the slide 12 has seated therein a rotatable member in the form of a hollow plug 22, in an interior portion 23 of which is contained a spring 24 at its lower end 25 engaging the ways 10 and at its upper end 26 engaging the plug 20 and exerting a force on the plug tending to turn it in a clockwise direction when viewed from above.

The plug 22 has a flat top 28 just clearing the underside of the slide 12 and a raised portion 30, including parallel faces best seen in Figs. 1 and 3–7, which extends upwardly into and slidably engages a track 35 in the underneath portion of the slide 12 adjacent and just above the ways 10. The track 35 has a widened portion 36 which has cooperating faces 37 and 38 which are angularly disposed, preferably at right angles to the track and offset from each other by the width of the raised portion 30 of the plug, or, in other words, by the width of the track.

With the parts in the position shown in Fig. 3, the slide 12 is free to move to the left relative to the rotatable member 22 under a force which is sufficient to overcome the friction of the parts until, as seen in Fig. 4, the left end of the plug 22 reaches the beginning of the widened portion 36 of the track 35, whereupon the spring 24 forces the plug in a counterclockwise direction and the plug is allowed to make a quarter turn until it assumes the position seen in Fig. 5, in which the faces 37 and 38 engage the raised portion 30 of the plug and hold it against the force of the spring. In this position of the parts, the slide 12 is locked against further movement in either direction and is therefore indexed in a predetermined position determined by the position of the plug 22.

In order to move the slide 12 further to the left and out of its indexed position, an excess of force must be exerted against it, which, as shown in Fig. 6, is sufficient to turn the plug 22 in a clockwise direction one-quarter turn back into its original position in the track. As shown, this force is exerted by the face 38 against the extended portion 30 of the plug, which turns the plug and, as shown in Fig. 7, allows the extended portion 30 to move into the right-hand portion of the track 35 so that the slide 12 can move on to the left.

It will be seen that the widened portions 36 are symmetrical with respect to relative movement of the slide 12 in either direction and also with respect to the direction of rotation of the plug 22, and that, therefore, the indexing and lock mechanism works equally well when the slide is moved in either direction with respect to the plug.

Fig. 1 shows the slide as having three widened portions 36 in the track 35 therefor providing three indexed positions of the slide 12 for the drilling of three holes in the work.

Figs. 8 and 9 show a modified embodiment of the invention arranged for rotational movement of the work for indexing it in a circular pattern.

The workpiece 13a is clamped onto a circular slide or turn table 12a which is pivotally secured by a spindle 14 to a circular slideway or platform 10a. A rotatable member 22a, having an extended portion 30a, is seated in the slideway 10a to cooperate with a circular track 35a in the slide 12a having a plurality of widened portions 36a, four being shown, for indexing the work successively with respect to the drill for drilling four holes which are arranged in a circle. The operation is in principle the same as that described above, a force in excess of that required to move the slide when the extended portion of the plug is in the track being required to move the slide from the indexed position.

It will be seen that one or more straight slideways and turn tables, as above described, may be combined in order to obtain universality of movement of one part relative to another together with various predetermined indexed positions of the one part with respect to the other.

Accuracy of the predetermined indexed position is retained even after wearing of the parts, for instance, the faces of the raised portion 30 of the plug 22 and the faces 37 and 38 in the enlarged portion of the track 35, because the wear is compensated by the turning force exerted on the plug 22 by the spring 24, which is exerted equally and in opposite direction against the faces 37 and 38, thus tending to center the slide 12 with respect to the slideway 10. This is a distinct advantage over the pin type of indexing mechanism which allows play after wearing of the pins, and in which wear occurs because of the sudden and violent stopping forces normally exerted upon them. There is no great cause for wear in the mechanism of the present invention because, as the slide approaches the indexed position, the raised portion 30 of the plug 22 engages the faces 37 and 38 of the enlarged portion 36 of the track 35 in a gradual rather than sudden manner, as can be seen from the description and illustration of the operation of the parts set forth herein.

I claim:

1. Indexing mechanism comprising a first and a second element, said elements being adjacent and relatively movable in a predetermined path, a rotatable member seated in said second element adjacent said first element, a spring urging said rotatable member to turn, a track in said first element, said rotatable member having a raised portion slidably engaging said track, said track having a widened portion including faces disposed substantially transversely on opposite sides of said track and which are offset from each other longitudinally with respect to the track and further including a clearance allowing said rotatable member to turn within limits when its raised portion enters said widened track portion during relative movement of said elements, said faces engaging said raised portion against the force of said spring when the rotatable member is in said turned position thereby causing said rotatable member to resist further relative movement of said elements.

2. Indexing mechanism comprising a first and a second element, said elements being adjacent and relatively movable in a predetermined path, a hole in said second element having its axis normal to the direction of relative movement of said elements, a rotatable member seated in said hole having one end adjacent said first element, a spring connected between said rotatable member and said second element urging said rotatable member to turn, a track in said first element adjacent said second element, said rotatable member having a raised portion including parallel faces slidably engaging said track, said track having a widened portion including faces at right angles to said track and on opposite sides thereof offset from each other longitudinally with respect to the track by the width of said raised portion and further including a clearance allowing said rotatable member to make a quarter turn when its raised portion enters said widened track portion during relative movement of said elements, said right angle faces engaging said raised portion against the force of said spring when the rotatable member is in said quarter-turned position thereby causing said rotatable member to resist further movement of said elements.

3. Indexing mechanism comprising a first and a second element, said elements being adjacent and relatively movable in a predetermined path, a hole in said second element having its axis normal to the direction of relative movement of said elements, a rotatable cylindrical member seated in said hole having one end adjacent said first element, a spring connected between said rotatable member and said second element urging said rotatable member to turn, a track in said first element adjacent said second element, said rotatable member having a raised portion including parallel faces slidably engaging said track, said track having a widened portion including faces at right angles to said track and on opposite sides thereof and which are offset from each other longitudinally with respect to the track by the width of said raised portion and further including a clearance allowing said rotatable member to make a quarter turn when its raised portion enters said widened track portion during relative movement of said elements, said right angle faces engaging said raised portion against the force of said spring when the rotatable member is in said quarter-turned position thereby causing said rotatable member to resist further movement of said elements, one of said right angle faces causing said raised portion to turn back into the continuation of said track when an excess force is applied further to move said elements.

4. Indexing mechanism comprising a dovetailed slide and slideway, a track in one of said parts along the path of the slideway, a rotatable member seated in the other of said parts having one end including parallel faces slidably guided in said track, a spring urging said rotatable member to turn in said track, said track having a widened portion including parallel faces at opposite sides of the track and at right angles to the track offset from each other longitudinally with respect to the track by the width of the track and further including a clearance allowing said rotatable member to make a quarter turn and to abut said track faces when it enters said widened track portion during movement of the slide and thereby to resist further movement of the slide in either direction.

5. Indexing mechanism comprising a pivotable turn table and a slideway, a circular track in one of said parts, a rotatable member seated in the other of said parts having one end including parallel faces slidably guided in said track, a spring urging said rotatable member to turn in said track, said track having a widened portion including parallel faces at opposite sides of the track at right angles to the track offset from each other longitudinally with respect to the track by the width of the track and further including a clearance allowing said rotatable member to make a quarter turn and to abut said track faces when it enters said widened track portion during movement of the slide thereby to resist further movement of the slide in either direction.

6. Indexing mechanism comprising a first and a second element, said elements being adjacent and relatively movable in a predetermined path, a member pivotally mounted on the second element, yieldable means urging said member to turn, a track in said first element, said member having an elongated portion slidably engaging said track, said track having a widened portion including faces disposed substantially transversely on opposite sides of said track and which are offset from each other longitudinally with respect to the track and further including a clearance which allows said member to turn within limits when its elongated portion enters the widened track portion providing resistance to further relative movement of the elements, said faces operating to return the member to its original rotative position in the track allowing further relative movement of the elements under a force sufficient to overcome said resistance.

References Cited in the file of this patent

FOREIGN PATENTS 477,619     Great Britain _____ Jan. 4, 1938